(12) United States Patent
Martin et al.

(10) Patent No.: US 11,473,029 B2
(45) Date of Patent: Oct. 18, 2022

(54) COMPOSITION FOR AN ELECTRIC VEHICLE

(71) Applicant: TOTAL MARKETING SERVICES, Puteaux (FR)

(72) Inventors: Didier Martin, St Laurent d'Agny (FR); Philippe China, Seyssuel (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 16/343,205

(22) PCT Filed: Oct. 26, 2017

(86) PCT No.: PCT/FR2017/052954
§ 371 (c)(1),
(2) Date: Apr. 18, 2019

(87) PCT Pub. No.: WO2018/078290
PCT Pub. Date: May 3, 2018

(65) Prior Publication Data
US 2019/0249102 A1    Aug. 15, 2019

(30) Foreign Application Priority Data
Oct. 27, 2016   (FR) ...................................... 1660470

(51) Int. Cl.
*C10M 107/34*  (2006.01)
*H01M 10/613*  (2014.01)
(Continued)

(52) U.S. Cl.
CPC ........ *C10M 107/34* (2013.01); *H01M 10/613* (2015.04); *H01M 10/625* (2015.04);
(Continued)

(58) Field of Classification Search
CPC ........ C10M 107/34; C10M 2209/1033; C10M 2209/1075; C10M 2209/1045;
(Continued)

(56) References Cited

U.S. PATENT DOCUMENTS 6,194,359 B1   2/2001   Beyer et al.
8,400,030 B1   3/2013   Tang et al.
(Continued)

FOREIGN PATENT DOCUMENTS

EP    2 520 637 A1    11/2012
JP    2009-242547 A   10/2009
(Continued)

OTHER PUBLICATIONS

International Search Report, issued in PCT/FR2017/052954, dated Dec. 20, 2017.
(Continued)

*Primary Examiner* — Ellen M McAvoy
(74) *Attorney, Agent, or Firm* — Birch, Stewart, Kolasch & Birch, LLP

(57) ABSTRACT

The use of a lubricant composition in order to cool and/or lubricate the engine of an electric vehicle and the different parts thereof, particularly moving parts, is disclosed. In particular, the use of a lubricant composition includes at least one polyalkylene glycol.

6 Claims, 1 Drawing Sheet

(51) Int. Cl.
  *H01M 10/625* (2014.01)
  *H01M 10/6567* (2014.01)
  *C10N 30/06* (2006.01)
  *C10N 40/14* (2006.01)
  *C10N 40/25* (2006.01)

(52) U.S. Cl.
  CPC .................. *H01M 10/6567* (2015.04); *C10M 2205/0285* (2013.01); *C10M 2207/28* (2013.01); *C10M 2209/1033* (2013.01); *C10M 2209/1045* (2013.01); *C10M 2209/1055* (2013.01); *C10M 2209/1065* (2013.01); *C10M 2209/1075* (2013.01); *C10N 2030/06* (2013.01); *C10N 2040/14* (2013.01); *C10N 2040/25* (2013.01); *H01M 2220/20* (2013.01)

(58) Field of Classification Search
  CPC .. C10M 2209/1055; C10M 2209/1065; H01M 10/625; H01M 10/6567; H01M 10/613; H01M 2220/20
  USPC ........................................................ 508/579
  See application file for complete search history.

(56) References Cited

U.S. PATENT DOCUMENTS

| | | | |
|---|---|---|---|
| 10,604,717 B2 * | 3/2020 | Lerasle | C10M 161/00 |
| 2011/0039741 A1 * | 2/2011 | Thoen | C10M 141/06 |
| | | | 508/476 |
| 2011/0190184 A1 * | 8/2011 | Kalley | C10M 171/008 |
| | | | 508/519 |
| 2013/0047616 A1 * | 2/2013 | Holmes | F24D 11/009 |
| | | | 60/670 |
| 2016/0168502 A1 * | 6/2016 | Lee | C10M 111/04 |
| | | | 508/185 |
| 2016/0168504 A1 * | 6/2016 | Lee | C10M 169/041 |
| | | | 508/505 |
| 2018/0134983 A1 * | 5/2018 | Broutin | C10M 169/041 |
| 2021/0139805 A1 * | 5/2021 | Champagne | C10M 105/38 |

FOREIGN PATENT DOCUMENTS

| | | |
|---|---|---|
| JP | 2012-184360 A | 9/2012 |
| JP | 2014-19712 A | 2/2014 |
| JP | 2016-98279 A | 5/2016 |
| WO | WO 2009/134716 A1 | 11/2009 |
| WO | WO 2011/113851 A1 | 9/2011 |
| WO | WO 2012/070007 A1 | 5/2012 |
| WO | WO 2013/164457 A1 | 11/2013 |
| WO | WO 2013/164459 A1 | 11/2013 |

OTHER PUBLICATIONS

Chinese Office Action issued in Application No. 201780063808.6 dated Jun. 2, 2021.

* cited by examiner

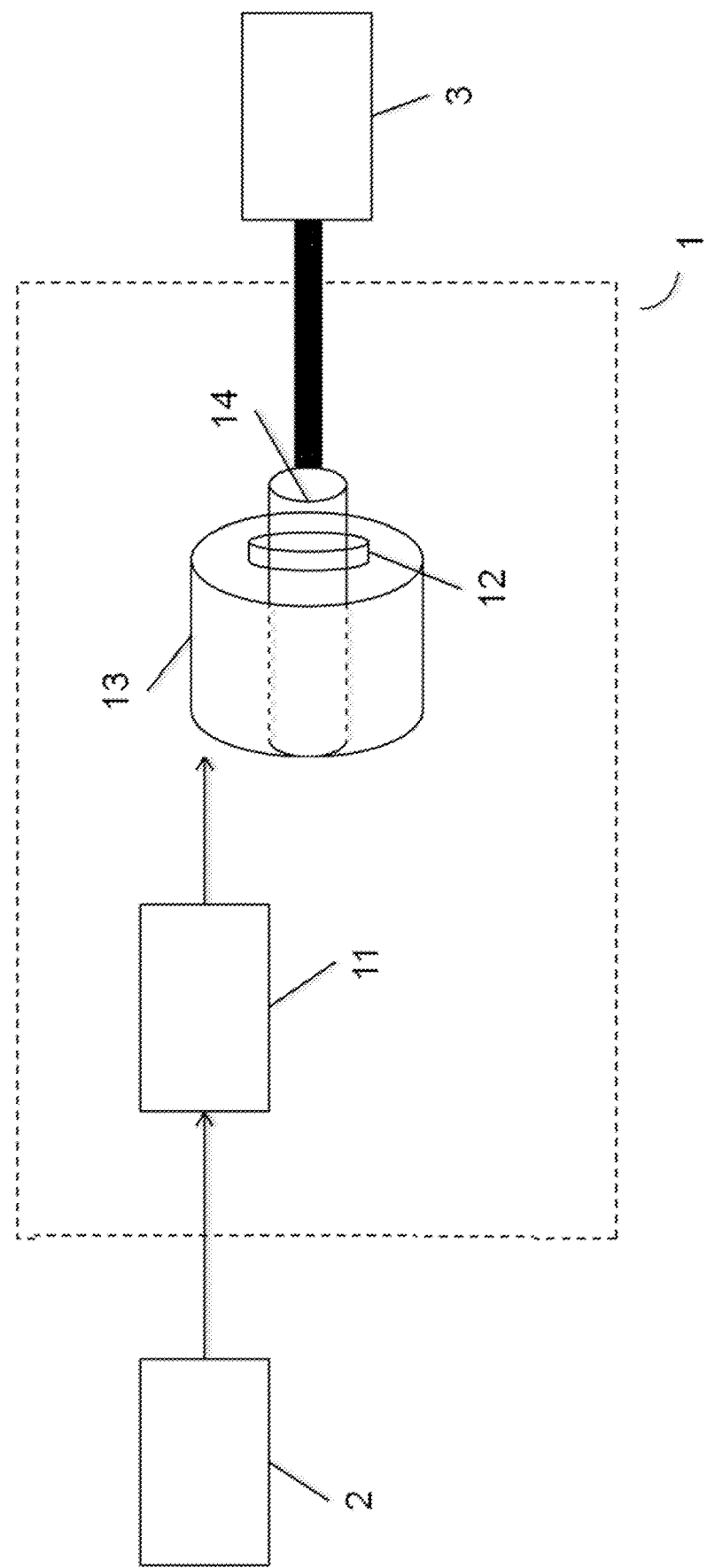

COMPOSITION FOR AN ELECTRIC VEHICLE

TECHNICAL FIELD

The invention relates to the use of a lubricant composition to cool and/or lubricate an electric vehicle engine and the different parts thereof, in particular moving parts. In particular, the invention relates to a lubricant composition comprising at least one polyalkylene glycol, to lubricate these moving parts and the transmission.

The invention also applies to the battery of an electric vehicle and a hybrid vehicle.

STATE OF THE ART

The development of international standards for reducing $CO_2$ emissions, but also for decreasing energy consumption, pushes motor vehicle manufacturers to propose alternative solutions to combustion engines.

One of the solutions identified by motor vehicle manufacturers consists in replacing combustion engines with electric engines. Research focusing on reducing $CO_2$ emissions has therefore led to developing electric vehicles by a certain number of motor vehicle companies. By "electric vehicle", in the sense of the present invention, this means a vehicle comprising an electric engine as a single drive means, unlike a hybrid vehicle which comprises, as drive means, a combustion engine and an electric engine.

Electric engines generate heat when they are functioning. If the quantity of heat generated is greater than the quantity of heat normally dissipated into the environment, it is necessary to ensure a cooling of the engine. Generally, the cooling is done on one or more parts of the engine generating heat and/or the parts of the engine sensitive to heat, in order to avoid reaching dangerous temperatures.

Traditionally, it is known to cool electric engines with air, generally by forced convection. This cooling method has the advantage of avoiding the preparation of a specific cooling fluid. However, with the appearance of smaller and smaller engines, and of which the power is greater and greater, this cooling method is no longer sufficient, in particular through the limited efficacy of air for cooling.

Today, methods for cooling the engine with water are also known. Although the heat capacity of water is high, it is not possible to consider a direct cooling by contact of water with the electric engine, because of the electrical conductivity of water. Thus, the cooling system requires the installation of an outer shell, which considerably increases the volume of the engine.

Methods for cooling an electric engine with oil jet have also already been proposed.

WO 2011/113851 describes the use of a lubricant composition comprising a base oil, preferably a polyalphaolefin (PAO) or GTL to cool an electric engine of a hybrid vehicle or vehicle equipped with a KERS (Kinetic Energy Recovery System). Electric engines of hybrid vehicles have a reduced frequency of use compared with the engines of electric vehicles. In addition, the power density is lower for electric engines of hybrid vehicles.

Thus, an electric vehicle engine is subjected to more significant stresses than an electric engine of a hybrid vehicle; this involves the use of an oil with increased cooling properties.

EP 2 520 637 describes a lubricant composition comprising at least one ester and one ether for the cooling of an electric engine and the lubrication of gears. However, it is known that esters can have an instability to oxidation. In addition, esters can pose compatibility problems with coatings and seals, which leads to a deterioration of the latter. In particular, the coiling of an electric engine is coated with a varnish. The lubricant composition being in direct contact with the coiling, it is essential that the lubricant composition is inert with regard to this varnish.

JP 2012/184360 describes a lubricant composition comprising a synthetic base oil and a fluorinated compound for the cooling of an electric engine. However, the hydrochlorofluorocarbons present in these compositions are organic gases having a significant negative impact on the ozone layer and are powerful greenhouse gases. Fluorinated gases are also targeted by several regulations aiming at highly limiting the use thereof.

The electric engine is powered by a battery. Lithium-ion batteries are the most commonly used in the field of electric vehicles. The decrease in the size of the batteries having the same power or an improved power poses problems in regulating the temperature of the batteries. Indeed, when the temperature of Li-ion batteries is too high, there is a risk of the battery igniting, even a risk of the battery exploding. Conversely, when the temperature is too low, there is a risk of premature discharging of the battery.

Today, in electric vehicles proposed by manufacturers, batteries are cooled by air, by water or by compositions comprising water and a glycol. No solution known to date in motor vehicles for the general public propose cooling a battery with a lubricant oil. An aim of the present invention is therefore to provide a lubricant composition overcoming all or some of the disadvantages of the prior art.

Thus, a first aim of the present invention is to provide a lubricant composition to cool an electric vehicle engine.

Another aim of the present invention is to provide a lubricant composition to cool the power electronics and/or the rotor and/or the stator of an electric vehicle engine.

Another aim of the present invention is to provide a lubricant composition to cool an electric vehicle engine and of which the formulation is easy to implement.

Another aim of the present invention is to provide a lubricant composition to lubricate and/or cool an electric vehicle engine.

Another aim of the present invention is to provide a lubricant composition to cool an engine and to lubricate the transmission of an electric vehicle.

Another aim of the present invention is to provide a lubricant composition to cool the battery of an electric vehicle.

Another aim of the present invention is to provide a lubricant composition to cool the electric engine of a hybrid vehicle.

To achieve the above aims and to overcome the disadvantages mentioned in the state of the art, the present invention proposes the use of a lubricant composition comprising at least one polyalkylene glycol (PAG) obtained by polymerisation or copolymerisation of alkylene oxides comprising 2 to 8 carbon atoms, preferably 2 to 4 carbon atoms.

Surprisingly, the applicant has observed that the presence of at least one PAG obtained by polymerisation or copolymerisation of alkylene acids comprising 2 to 8 carbon atoms, preferably 2 to 4 carbon atoms in a lubricant composition makes it possible for the lubricant composition, once implemented in an electric vehicle engine, to cool said engine.

Thus, the present invention makes it possible to formulate lubricant compositions having, at the same time, a good stability, in particular to oxidation, and good properties for cooling an electric vehicle engine.

Advantageously, the lubricant compositions according to the invention have good properties for cooling an electric vehicle engine while having good deaeration properties.

Advantageously, the lubricant compositions according to the invention have good properties for cooling an electric vehicle engine while having good anticorrosion properties.

Advantageously, the lubricant compositions according to the invention have good properties for cooling an electric vehicle engine while limiting the risks of deteriorating seals or varnishes present in the engine.

Advantageously, the lubricant compositions according to the invention have good properties for cooling an electric vehicle engine, while being respectful of the environment and health.

Advantageously, the lubricant compositions according to the invention have good properties for cooling an electric vehicle engine, while having good water retention properties, thus reducing the risk of water contact with the coating of the coiling of an electric vehicle engine, and therefore the risk of deterioration of said coiling.

Advantageously, the lubricant compositions according to the invention have good properties for cooling the power electronics and/or the rotor and/or the stator of an electric vehicle engine.

Advantageously, the lubricant compositions according to the invention have good properties for cooling and for lubricating an electric vehicle engine.

Advantageously, the lubricant compositions according to the invention have good properties for cooling an engine and for lubricating the transmission, in particular of the reduction gear of an electric vehicle.

Advantageously, the lubricant compositions according to the invention have good properties for cooling the battery of an electric vehicle.

Advantageously, the lubricant compositions according to the invention have good properties for cooling a hybrid vehicle electric engine.

BRIEF DESCRIPTION OF THE INVENTION

The invention thus relates to the use of a composition comprising at least one polyalkylene glycol (PAG) obtained by polymerisation or copolymerisation of alkylene oxides comprising 2 to 8 carbon atoms, preferably 2 to 4 carbon atoms in an electric vehicle.

Advantageously, the invention relates to the use of a composition comprising at least one polyalkylene glycol (PAG) obtained by polymerisation or copolymerisation of alkylene oxides comprising 2 to 8 carbon atoms, preferably 2 to 4 carbon atoms to cool the engine.

Advantageously, the invention relates to the use of a composition comprising at least one polyalkylene glycol (PAG) obtained by polymerisation or copolymerisation of alkylene oxides comprising 2 to 8 carbon atoms, preferably 2 to 4 carbon atoms to cool the power electronics and/or the rotor and/or the stator of the engine.

Advantageously, the invention relates to the use of a composition comprising at least one polyalkylene glycol (PAG) obtained by polymerisation or copolymerisation of alkylene oxides comprising 2 to 8 carbon atoms, preferably 2 to 4 carbon atoms to cool the battery.

Advantageously, the invention relates to the use of a composition comprising at least one polyalkylene glycol (PAG) obtained by polymerisation or copolymerisation of alkylene oxides comprising 2 to 8 carbon atoms, preferably 2 to 4 carbon atoms to lubricate the engine.

Advantageously, the invention relates to the use of a composition comprising at least one polyalkylene glycol (PAG) obtained by polymerisation or copolymerisation of alkylene oxides comprising 2 to 8 carbon atoms, preferably 2 to 4 carbon atoms to lubricate the bearings located between the rotor and the stator and/or the reduction gear of the engine.

Advantageously, the invention relates to the use of a composition comprising at least one polyalkylene glycol (PAG) obtained by polymerisation or copolymerisation of alkylene oxides comprising 2 to 8 carbon atoms, preferably 2 to 4 carbon atoms to lubricate the transmission.

Advantageously, the invention relates to the use of a composition comprising at least one polyalkylene glycol (PAG) obtained by polymerisation or copolymerisation of alkylene oxides comprising 2 to 8 carbon atoms, preferably 2 to 4 carbon atoms to cool and lubricate the engine.

Advantageously, the invention relates to the use of a composition comprising at least one polyalkylene glycol (PAG) obtained by polymerisation or copolymerisation of alkylene oxides comprising 2 to 8 carbon atoms, preferably 2 to 4 carbon atoms to cool the engine and lubricate the transmission.

Advantageously, the PAG is obtained by copolymerisation of ethylene oxide and propylene oxide.

Advantageously, the PAG is obtained by polymerisation of ethylene oxide.

Advantageously, the PAG is obtained by polymerisation of propylene oxide.

Advantageously, the PAG is obtained by polymerisation of butylene oxide.

Advantageously, the lubricant composition comprises 1 to 99% of PAG by weight with respect to the total weight of the composition, preferably 50 to 99%, more preferably 70 to 99%, advantageously 80 to 99%.

DETAILED DESCRIPTION OF THE INVENTION

The invention relates to the use of a composition comprising at least one polyalkylene glycol (PAG) obtained by polymerisation or copolymerisation of alkylene oxides comprising 2 to 8 carbon atoms, preferably 2 to 4 atoms in an electric vehicle.

Lubricant Composition:

The lubricant composition according to the invention comprises at least one polyalkylene glycol (PAG) obtained by polymerisation or copolymerisation of alkylene oxides comprising 2 to 8 carbon atoms, preferably 2 to 4 carbon atoms.

The PAG can be a polymer or a copolymer (statistic or blocks) of alkylene oxides comprising 2 to 8 carbon atoms, preferably 2 to 4 carbon atoms, which can be, in particular, prepared according to the methods described in application WO 2009/134716, page 2 line 26 to page 4 line 12, for example by attacking an alcohol initiator on the epoxy bond of an alkylene oxide and propagating the reaction.

These PAGs can be prepared, by reaction of one or more alcohols with an alkylene oxide or a mixture of alkylene oxides comprising 2 to 8 carbon atoms, preferably 2 to 4 carbon atoms.

In a preferred embodiment of the invention, the PAG is prepared from alcohol comprising 3 to 12 carbon atoms. As an alcohol example, butanol can be cited.

In a preferred embodiment, the PAG is obtained by polymerisation or copolymerisation of ethylene oxide, propylene oxide and/or butylene oxide.

In a preferred embodiment, the PAG is obtained by polymerisation of ethylene oxide.

In a more preferred embodiment, the PAG is obtained by copolymerisation of ethylene oxide and propylene oxide.

In a more preferred embodiment, the PAG is obtained by copolymerisation of propylene oxide and butylene oxide.

In another more preferred embodiment, the PAG is obtained by polymerisation of butylene oxide.

Particularly advantageously, the PAG is obtained by polymerisation of propylene oxide.

As examples of PAG that could be used in the lubricant composition used according to the invention, the PAGs described in documents WO 2012/070007 or WO 2013/164457 can be cited.

As examples of particularly preferred PAGs, Synalox 100-20B® and Synalox 100-50B® of the company DOW can be cited.

In one embodiment, the lubricant composition comprises 1 to 99% by weight with respect to the total weight of the composition.

In a preferred embodiment, the lubricant composition comprises 50 to 99%, preferably 70 to 99%, advantageously 80 to 99% by weight with respect to the total weight of the composition; this embodiment could correspond to the use of the PAG according to the invention as a majority or single base oil in the lubricant composition.

In another preferred embodiment, the lubricant composition comprises 1 to 40%, preferably 5 to 30%, advantageously 10 to 30% by weight with respect to the total weight of the composition; this embodiment corresponding to the use of the PAG according to the invention as a secondary oil (or co-base oil) in the lubricant composition.

Thus, the lubricant composition according to the present invention can further comprise an additional base oil known in the field of lubricants.

The additional base oil used in the lubricant compositions according to the invention can be oils of mineral or synthetic origins belonging to groups I to V according to the classes defined in the API classification (or the equivalents thereof according to the ATIEL classification) (table A) or mixtures thereof.

TABLE A

| | Saturate content | Sulphur content | Viscosity index (VI) |
|---|---|---|---|
| Group 1 Mineral oils | <90% | >0.03% | 80 ≤ VI < 120 |
| Group II Hydrocracked oils | ≥90% | ≤0.03% | 80 ≤ VI < 120 |
| Group III Hydrocracked or hydro-isomerised oils | ≥90% | ≤0.03% mec | ≥120 |
| Group IV | Polyalphaolefins (PAO) | | |
| Group V | Esters and other bases not included in groups I to IV | | |

Mineral base oils according to the invention include all types of base oils obtained by atmospheric and vacuum distillation of crude oil, followed by refining operations such as solvent extraction, upgrading, solvent dewaxing, hydrotreatment, hydrocracking, hydro-isomerisation and hydrofinishing.

Mixtures of synthetic and mineral oils can also be used.

There is generally no limitation as regards using different lubricant bases to achieve lubricant compositions used according to the invention, if not that they must have properties, in particular viscosity, viscosity index, sulphur content, resistance to oxidation, adapted to a use for engines or for vehicle transmissions.

Base oils of lubricant compositions used according to the invention can also be selected from among synthetic oils, such as certain carboxylic acid and alcohol esters, and from among polyalphaolefins. The polyalphaolefins used as base oils are, for example, obtained from monomers comprising 4 to 32 carbon atoms, for example from octene or decene, and of which the viscosity at 100° C. is between 1.5 and 15 mm$^2 \cdot$s$^{-1}$ according to the ASTM D445 standard. The average molecular mass thereof is generally between 250 and 3000 according to the ASTM D5296 standard.

Preferably, the base oils of the present invention are selected from among the above base oils, of which the aromatic content is between 0 and 45%, preferably between 0 and 30%. The aromatic content of the oils is measured according to the UV Burdett method.

The lubricant composition according to the present invention can further comprise an additive, selected from among friction modifiers, detergents, anti-wear additives, extreme-pressure additives, viscosity index improvers, dispersants, antioxidants, improvers of the pour point, defoaming agents, thickeners and the mixtures thereof.

Anti-wear additives and extreme-pressure additives protect the surfaces undergoing friction by forming a protective film adsorbed on these surfaces.

There is a great variety of anti-wear additives. Preferably, for the lubricant composition according to the invention, the anti-wear additives are selected from among phospho-sulphurous additives like metal alkylthiophosphates, in particular zinc alkyithiophosphates, and more specifically zinc dialkyldithiophosphates or ZnDTP. The preferred compounds are of formula Zn$((SP(S)(OR^2)(OR^3))_2$, wherein $R^2$ and $R^3$, identical or different, represent independently an alkyl group, preferably an alkyl group comprising 1 to 18 carbon atoms.

Amine phosphates are also anti-wear additives which can be used in the lubricant composition according to the invention. However, the phosphorus contributed by these additives can act as a poison for the catalytic systems of motor vehicles, as these additives generate ash. These effects can be minimised by partially substituting amine phosphates by additives not contributing phosphorus, such as, for example, polysulphides, in particular sulphurous olefins.

Advantageously, the lubricant composition according to the invention can comprise 0.01 to 6% by mass, preferably 0.05 to 4% by mass, more preferably 0.1 to 2% by mass with respect to the total mass of lubricant composition, anti-wear additives and extreme-pressure additives.

Advantageously, the lubricant composition according to the invention can comprise at least one friction modifier additive. The friction modifier additive can be selected from among a compound contributing metal elements and a compound with no ash. Among compounds contributing metal elements, transition metal complexes can be cited, such as Mo, Sb, Sn, Fe, Cu, Zn of which the ligands can be hydrocarbon compounds comprising oxygen, nitrogen, sulphur or phosphorus atoms. Friction modifier additives with no ash are generally of an organic origin and can be selected from among fatty acid monoesters and polyols, alkoxylated amines, alkoxylated fatty amines, fatty epoxides, borated fatty epoxides, fatty amines or fatty acid glycerol esters. According to the invention, the fatty compounds comprise at least one hydrocarbon group comprising 10 to 24 carbon atoms.

Advantageously, the lubricant composition according to the invention can comprise 0.01 to 2% by mass or 0.01 to 5% by mass, preferably 0.1 to 1.5% by mass or 0.1 to 2% by mass with respect to the total mass of the lubricant composition, of friction modifier additive.

Advantageously, the lubricant composition according to the invention can comprise at least one antioxidant additive.

The antioxidant additive generally makes it possible to delay the degradation of the lubricant composition in use. This degradation can in particular translate into the formation of deposits, into the presence of sludge or into an increase in the viscosity of the lubricant composition.

The antioxidant additives act, in particular, as radical inhibitors or hydroperoxide destroyers. Among the antioxidant additives commonly used, antioxidant additives of phenolic type, antioxidant additives of amino type, phospho-sulphurous antioxidant additives can be cited. Some of these antioxidant additives, for example phosphor-sulphurous antioxidant additives can generate ash. The phenolic antioxidant additives can have no ash or be in the form of neutral or basic metal salts. The antioxidant additives can in particular be selected from among sterically hindered phenols, sterically hindered phenol esters and sterically hindered phenols comprising a thioether bridge, diphenylamines, diphenylamines substituted by at least one alkyl group in $C_1$-$C_{12}$, N,N'-dialkyl-aryl-diamines and the mixtures thereof.

Preferably according to the invention, sterically hindered phenols are selected from among compounds comprising a phenol group, of which at least one vicinal carbon of the carbon carrying the alcohol function is substituted by at least one alkyl group in $C_1$-$C_{10}$, preferably an alkyl group in $C_1$-$C_6$, preferably an alkyl group in $C_4$, preferably by the ter-butyl group.

The amino compounds are another class of antioxidant additives that could be used, possibly combined with phenolic antioxidant additives. Examples of amino compounds are aromatic amines, for example aromatic amines of formula $NR^4R^5R^6$, wherein $R^4$ represents an aliphatic group or an aromatic group, possibly substituted, $R^5$ represents an aromatic group, possibly substituted, $R^6$ represents a hydrogen atom, an alkyl group, an aryl group or a group of formula $R^7S(O)_zR^8$, wherein $R^7$ represents an alkylene group or an alkenylene group, $R^8$ represents an alkyl group, an alkenyl group or an aryl group and z represents 0, 1 or 2.

Sulphurized alkylphenols or the salts thereof of alkaline and alkaline earth metals can also be used as antioxidant additives.

Another class of antioxidant additive is that of copper compounds, for example, copper thio- or dithio-phosphates, copper salts and carboxylic acids, copper dithiocarbamates, sulfonates, phenates, acetylacetonates. Copper I and II salts, succinic acid or anhydrides salts can also be used.

The lubricant composition according to the invention can contain any types of antioxidant additives known to a person skilled in the art.

Advantageously, the lubricant composition comprises at least one ashless antioxidant additive.

Also advantageously, the lubricant composition according to the invention comprises 0.5 to 2% by weight with respect to the total mass of the composition, of at least one antioxidant additive.

The lubricant composition according to the invention can also comprise at least one detergent additive.

Detergent additives generally make it possible to reduce the formation of deposits on the surface of metal parts by dissolution of oxidation and combustion secondary products.

Detergent additives which can be used in the lubricant composition according to the invention are generally known to a person skilled in the art. Detergent additives can be anionic compounds comprising a long lipophilic hydrocarbon chain and a hydrophilic head. The associated cation can be a metal cation of an alkaline or alkaline earth metal.

Detergent additives are preferably selected from among alkaline metal salts or carboxylic acid alkaline earth metals, sulfonates, salicylates, naphthenates, as well as phenate salts. Alkaline and alkaline earth metals are preferably calcium, magnesium, sodium or barium.

These metal salts generally comprise metal in a stoichiometric quantity or excess quantity, therefore in a quantity greater than the stoichiometric quantity. These are thus overbased detergent additives; the excess metal contributing the overbased detergent additive character is thus generally in the form of a metal salt, insoluble in oil, for example a carbonate, a hydroxide, an oxalate, an acetate, a glutamate, preferably a carbonate.

Advantageously, the lubricant composition according to the invention can comprise 2 to 4% by weight of detergent additive with respect to the total mass of the lubricant composition.

Also advantageously, the lubricant composition according to the invention can also comprise at least one pour point depressant additive.

By slowing the formation of paraffin crystals, the pour point depressant additives generally improve the cold-performance of the lubricant composition according to the invention.

As an example of pour point depressant additives, alkyl polymethacrylates, polyacrylates, polyarylamides, polyalkylphenols, polyalkylnaphthalenes, alkyl polystyrenes can be cited.

Advantageously, the lubricant composition according to the invention can also comprise at least one dispersant.

The dispersant can be selected from among Mannich bases, succinimides and the derivatives thereof.

Also advantageously, the lubricant composition according to the invention can comprise 0.2 to 10% by mass of dispersant with respect to the total mass of the lubricant composition.

The lubricant composition of the present invention can also comprise at least one additive improving the viscosity index. As examples of additives improving the viscosity index, polymer, homopolymer or copolymer, hydrogenated or non-hydrogenated, styrene, butadiene and isoprene esters, polyacrylates, polymethacrylates (PMA) or also olefin copolymers, in particular ethylene/propylene copolymers can be cited.

The lubricant composition according to the invention can be presented in different forms. The lubricant composition according to the invention can, in particular, be an anhydrous composition.

Preferably, this lubricant composition is not an emulsion.

Electric Vehicle:

In one embodiment, the lubricant composition according to the invention is used to cool the engine of an electric vehicle.

FIG. 1 is a schematic representation of an electric motorisation system.

The engine of an electric vehicle (1) comprises power electronics (11) connected to a stator (13) and a rotor (14).

The rotation speed of the rotor is very high, which involves adding a speed reduction gear (3) between the electric engine (1) and the wheels of the vehicle.

The stator comprises coils, in particular copper coils which are supplied alternatively by an electric current. This makes it possible to generate a rotating magnetic field. The rotor itself comprises coils or permanent magnets or other magnetic materials and is rotated by the rotating magnetic field.

The power electronics, the stator and the rotor of an electric engine are parts featuring a complex structure and generating a high quantity of heat during the functioning of the engine. That is why the lubricant composition such as defined above is more specifically used to cool the power electronics and/or the rotor and/or the stator of the electric engine.

In a preferred embodiment, the invention relates to the use of a lubricant composition such as defined above to cool the power electronics, the rotor and the stator of the electric engine.

A bearing (12) making it possible to maintain the rotation axis is also integrated between the rotor and the stator. This bearing undergoes high mechanical stresses and poses wear problems through fatigue. It is therefore necessary to lubricate the bearing, in order to increase the lifespan thereof. That is why the lubricant composition such as defined above is also used to lubricate an electric vehicle engine.

In a preferred embodiment, the invention relates to the use of a lubricant composition such as defined above to lubricate the bearings located between the rotor and the stator.

The reduction gear (3), which forms part of the transmission, has the role of reducing the rotation speed at the outlet of the electric engine and adapting the speed transmitted to the wheels, making it possible at the same time to control the speed of the vehicle. This reduction gear undergoes high friction stresses and therefore requires being lubricated suitably in order to avoid it being damaged too quickly. That is why the lubricant composition such as defined above is also used to lubricate the reduction gear and the transmission of an electric vehicle.

In a preferred embodiment, the invention relates to the use of a lubricant composition such as defined above to lubricate the reduction gear of an electric vehicle.

The invention also relates to the use of a lubricant composition such as defined above to cool the power electronics and/or the rotor/stator couple and to lubricate the reduction gear and/or the bearings of the rotor/stator couple of an engine of an electric vehicle.

The invention also relates to the use of a lubricant composition such as defined above to cool the battery of an electric vehicle.

Indeed, the electric engine is supplied by an electric battery (2). The lithium-ion batteries are more common in the field of electric vehicles. The development of more and more powerful batteries and of which the size is more and more reduced, involves the appearance of the problem of cooling this battery. Indeed, as soon as the battery exceeds temperatures of around 50 to 60° C., there is a high risk that the battery ignites, even explodes. There is also a need to maintain the battery at a temperature greater than around 20 to 25° C. in order to avoid the battery being discharged too quickly and to extend the lifespan thereof. There is therefore a need to maintain the battery at an acceptable temperature.

The invention also relates to the use of a composition such as defined above to cool the battery and the engine of a motor vehicle.

The invention also relates to the use of a lubricant composition such as defined above to cool a hybrid vehicle electric engine.

All of the characteristics and preferences described for the lubricant composition and for the PAG also apply to these uses.

The invention also relates to a method for cooling an electric vehicle engine comprising at least one step of contacting a mechanical part of the engine with a composition as defined above.

The invention also relates to a method for cooling the power electronics and/or the rotor and/or the stator of an electric vehicle engine comprising at least one step of contacting the power electronics and/or the rotor and/or the stator with a composition as defined above.

The invention also relates to a method for lubricating an electric vehicle engine comprising at least one step of contacting a mechanical part of the engine with a composition as defined above.

The invention also relates to a method for lubricating bearings located between the rotor and the stator and/or the reduction gear of an electric vehicle engine comprising at least one step of contacting said bearings with a composition as defined as above.

The invention also relates to a method for cooling and lubricating an electric vehicle engine comprising at least one step of contacting a mechanical part of the engine with a composition as defined above.

The invention also relates to a method for cooling an electric vehicle engine and lubricating the transmission of said electric vehicle comprising at least one step of contacting a mechanical part of the engine and of the transmission with a composition as defined above.

The invention also relates to a method for cooling the power electronics and/or of the rotor/stator couple and lubricating the reduction gear and/or the bearings of the rotor/stator couple of an electric vehicle engine comprising at least one step of contacting the power electronics and/or the rotor and/or the stator and the reduction gear and/or the bearings of the rotor/stator couple with a composition as defined above.

The invention also relates to a method for cooling the battery of an electric vehicle comprising at least one step of contacting the battery with a composition as defined above.

The invention also relates to a method for cooling the battery and the engine of an electric vehicle comprising at least one step of contacting the battery and a mechanical part of the engine with a composition as defined above.

The invention also relates to a method for cooling a hybrid vehicle engine comprising at least one step of contacting a mechanical part of the engine with a composition as defined above.

All of the characteristics and preferences described for the lubricant composition and for the PAG above also apply to these methods.

The cooling of the electric engine by the lubricant composition according to the invention can be implemented by any method known to a person skilled in the art.

As implementation examples, cooling by jet, by spraying or also by forming a mist from the lubricant composition according to the invention, pressurised and by gravity can be cited, in particular on the coiling of the rotor and/or of the stator.

EXAMPLES

Two lubricant compositions, CI1 and CC1 have been formulated as described in table 1. The quantities of different compounds are expressed as a mass percentage with respect to the total weight of the composition.

TABLE 1

|  | CI1 (according to the invention) | CC1 (comparative) |
|---|---|---|
| PAG 1 obtained by polymerisation of propylene oxides (SYNALOX 100-20B ®) of the company DOW) | 52.8 | — |
| PAG 2 obtained by polymerisation of propylene oxides (SYNALOX 100-50B ®) of the company DOW) | 44 | — |
| PAO 1 (viscosity of 4 mm$^2$/s measured at 100° C. according to the ASTM D445 standard) | — | 68.1 |
| PAO 2 (viscosity of 1000 mm$^2$/s measured at 100° C. according to the ASTM D445 standard) | — | 19.6 |
| Ester (NB7400 ® of the company NYCO) | — | 10 |
| Package of additives 1 | 3.2 | — |
| Package of additives 2 | — | 2.3 |

A means for measuring the thermal properties of a fluid consists in measuring the thermal exchange coefficient of the fluid (thermal transfer by surface unit and temperature). A fluid having a higher thermal exchange coefficient has better cooling properties.

A test making it possible to measure the thermal exchange coefficient of each of the lubricant compositions described in table 1 has been carried out.

The principle of the test consists in projecting an oil jet using a sprinkler perpendicularly on the metal plate heated by induction. A thermal camera, placed above the plate, records the temperature profile during the projection of oil. From the variation values of the temperature on the plate, it is thus possible to calculate the thermal exchange coefficient means of the lubricant composition.

It is possible to make different parameters vary, in particular the temperature of the plate, the size of the sprinkler and the pressure at which the oil is projected. The measurement of the thermal coefficient is taken at different distances from the impact point of the jet on the metal plate, this distance corresponding to the radius. The conditions of the test are described in table 2.

TABLE 2

Conditions of the test

| Characteristic | Unit |  |
|---|---|---|
| Temperature | ° C. | 113 |
| Pressure | bar | 20-40 |
| Diameter of the sprinkler | mm | 0.5 |
| Radius | mm | 0-15 |

The values of the thermal coefficients of the compositions tested under the test conditions of table 2, according to the radius, are presented in tables 3 to 6. The values of the thermal exchange coefficients are expressed in W/K·m$^2$.

TABLE 3

Thermal exchange coefficients of the compositions - Radius 0 mm

| Pressure (bar) | CI1 | CC1 |
|---|---|---|
| 40 | 4015 | 2520 |
| 38 | 3954 | 2486 |

TABLE 3-continued

Thermal exchange coefficients of the compositions - Radius 0 mm

| Pressure (bar) | CI1 | CC1 |
|---|---|---|
| 36 | 4109 | 2557 |
| 34 | 4200 | 2323 |
| 32 | 3881 | 2135 |
| 30 | 3550 | 2060 |
| 28 | 3240 | 1858 |
| 26 | 4674 | 1815 |

TABLE 4

Thermal exchange coefficients of the compositions - Radius 5 mm

| Pressure (bar) | CI1 | CC1 |
|---|---|---|
| 40 | 3404 | 2459 |
| 38 | 3296 | 2417 |
| 36 | 3359 | 2389 |
| 34 | 3458 | 2216 |
| 32 | 3236 | 2019 |
| 30 | 3048 | 1966 |
| 28 | 2811 | 1819 |
| 26 | 3837 | 1780 |

TABLE 5

Thermal exchange coefficients of the compositions - Radius 10 mm

| Pressure (bar) | CI1 | CC1 |
|---|---|---|
| 40 | 2993 | 2031 |
| 38 | 2831 | 1962 |
| 36 | 2808 | 1919 |
| 34 | 2822 | 1765 |
| 32 | 2655 | 1583 |
| 30 | 2489 | 1523 |
| 28 | 2329 | 1375 |
| 26 | 3275 | 1318 |

TABLE 6

Thermal exchange coefficients of the compositions - Radius 15 mm

| Pressure (bar) | CI1 | CC1 |
|---|---|---|
| 40 | 2398 | 1323 |
| 38 | 2211 | 1269 |
| 36 | 2141 | 1239 |
| 34 | 2021 | 1147 |
| 32 | 1880 | 1052 |
| 30 | 1734 | 1012 |
| 28 | 1630 | 928 |
| 26 | 2402 | 908 |

The thermal exchange coefficient is even higher for the composition CI according to the invention than for the comparative composition CC corresponding to a composition of the prior art. This demonstrates that a composition according to the invention has better thermal properties compared with a composition of the prior art, thus involving better cooling properties of an electric vehicle engine.

Moreover, a deaeration measurement according to the method ASTM D3427 was taken on the composition CI according to the invention. This measurement has made it possible to highlight that no air volume is absorbed by the composition during the test. This makes it possible to demonstrate that a composition according to the invention has good deaeration properties, and therefore conserves good cooling properties over time.

The invention claimed is:

1. A method for cooling one or more components of an electric vehicle, said components comprising an engine, power electronics, a rotor, a stator of the engine, or a battery, said method comprising:
   cooling the one or more components of the electrical vehicle with a composition comprising at least one polyalkylene glycol (PAG) obtained by polymerisation of butylene oxide or by copolymerisation of ethylene oxide and propylene oxide, wherein the lubricant composition comprises 50 to 99% of PAG by weight with respect to the total weight of the composition,
   wherein the electric vehicle comprises an electric engine as a single drive.

2. The method according to claim 1, comprising:
   cooling and lubricating the engine.

3. The method according to claim 1, comprising:
   cooling the engine and lubricating the transmission.

4. The method according to claim 1, wherein the lubricant composition comprises 70 to 99% of PAG by weight with respect to the total weight of the composition.

5. A method for lubricating one or more components of an electric vehicle, said components comprising an engine, bearings located between a rotor and a stator, a reduction gear of the engine, or a transmission, said method comprising:
   lubricating the one or more components of the electric vehicle with a composition comprising at least one polyalkylene glycol (PAG) obtained by polymerisation of butylene oxide or by copolymerisation of ethylene oxide and propylene oxide, wherein the lubricant composition comprises 50 to 99% of PAG by weight with respect to the total weight of the composition,
   wherein the electric vehicle comprises an electric engine as a single drive.

6. A method for cooling a battery of an electric vehicle, said method comprising:
   cooling the battery of the electrical vehicle with a composition comprising at least one polyalkylene glycol (PAG) obtained by polymerisation of butylene oxide or by copolymerisation of ethylene oxide and propylene oxide, wherein the lubricant composition comprises 50 to 99% of PAG by weight with respect to the total weight of the composition,
   wherein the electric vehicle comprises an electric engine as a single drive.

* * * * *